Jan. 3, 1939.   J. R. LEHMAN   2,142,566
SLOTTER KNIFE
Filed Aug. 13, 1937   2 Sheets-Sheet 1

INVENTOR.
JOHN R. LEHMAN
BY
Kwis Hudson & Kent
ATTORNEYS

Jan. 3, 1939. J. R. LEHMAN 2,142,566
SLOTTER KNIFE
Filed Aug. 13, 1937 2 Sheets-Sheet 2
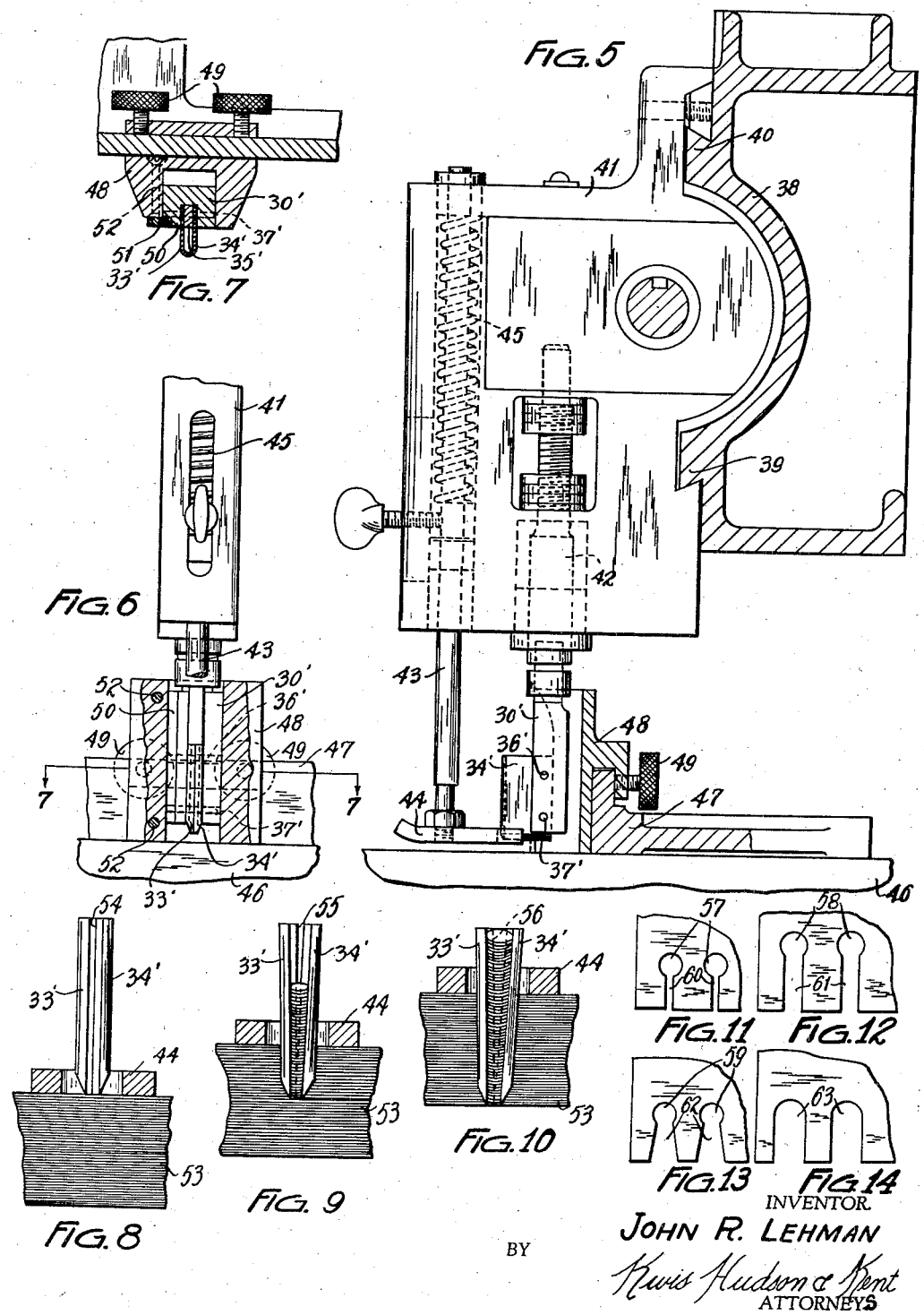
INVENTOR.
JOHN R. LEHMAN
BY
ATTORNEYS Patented Jan. 3, 1939

2,142,566

UNITED STATES PATENT OFFICE 2,142,566

SLOTTER KNIFE

John R. Lehman, Dayton, Ohio, assignor to Harris-Seybold-Potter Company, Cleveland, Ohio, a corporation of Ohio Application August 13, 1937, Serial No. 158,939

5 Claims. (Cl. 164—86)

This invention relates to improvements in slotter knives, more specifically knives for cutting slots in paper, cardboard or the like.

Cutters for this purpose as heretofore constructed have been made in one piece of U-shaped cross-section with the cutting edge at one end. The cuttings necessarily travel from the cutting edge to the opposite end of the cutter before they may be discharged. As a consequence of this fact, the cuttings sometimes jam in the cutter, necessitating interruption in the operation of the machine to permit of cleaning out the cutter.

In accordance with the present invention, the cutter is divided longitudinally throughout at least a portion of its length, so that the walls may yield or part slightly under internal pressure from the cuttings, and thus relieve the pressure and permit the discharge of cuttings so that interruption of the work due to jamming is eliminated.

Accordingly, one of the objects of the present invention is the provision of a cutter for slotting machines which will continue in operation indefinitely without jamming.

Another object is the provision of a cutter so formed as to facilitate the sharpening operation.

Still another object is the provision of a cutter of the character described having a parting or division line at the position which is most remote from the cutter holder, whereby the maximum degree of flexibility may be obtained.

Other objects and features of novelty will appear as I proceed with the description of those embodiments of the invention which, for the purposes of the present application, I have illustrated in the accompanying drawings, in which—

Fig. 4 is a horizontal sectional view of the cutter, cutter holder, and back gauge, the view being taken substantially on the line 4—4 of Fig. 2;

Fig. 5 is a fragmental side elevational view, partly in vertical section, of a multiple spindle drill and slotter embodying the invention;

Fig. 6 is a front elevational view of the same, certain parts being broken away and others shown in section in order to more clearly illustrate the invention;

Fig. 7 is a horizontal sectional view taken substantially on the line 7—7 of Fig. 6;

Figs. 8, 9, and 10 are diagrammatic rear elevational views illustrating in an exaggerated manner the condition of the cutter in three different stages of operation; and Figs. 11, 12, 13, and 14 are fragmental views of paper or cardboard sheets showing different slots which may be cut upon the machine.

Figure 3:
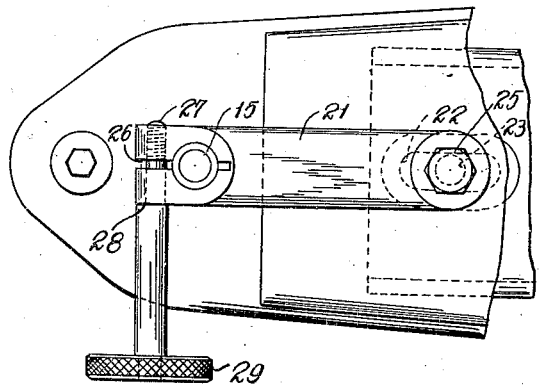
Fig. 3 is a top plan view of the same.
Figure 2:
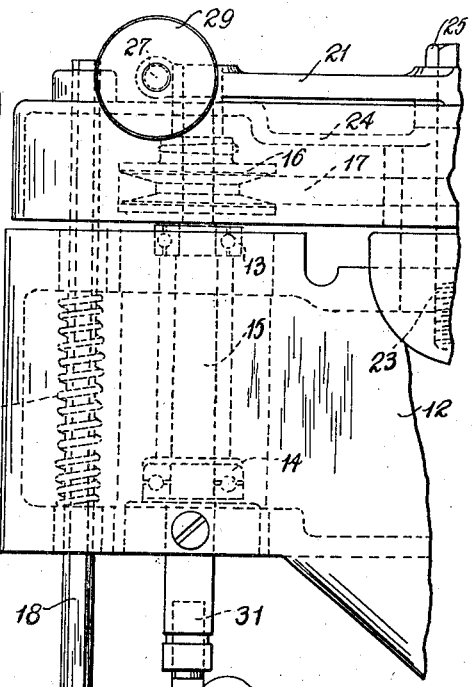
Fig. 2 is a front elevational view of the same.
Figure 2:
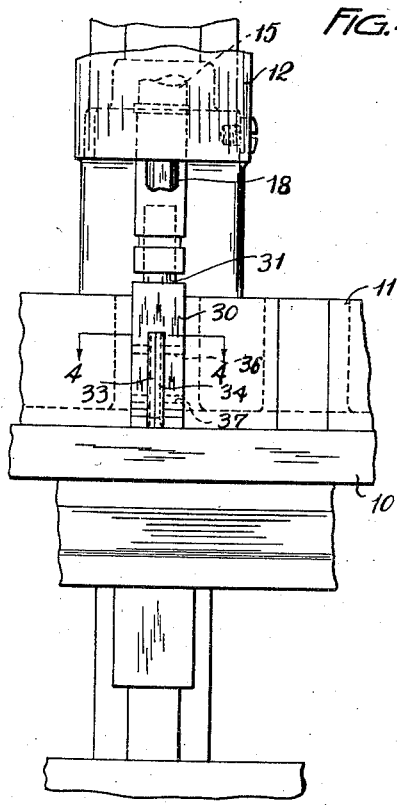
Figure 1:
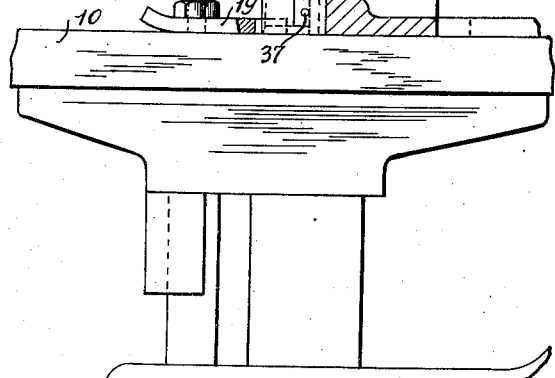
Fig. 1 is a fragmental side elevational view of a single spindle paper drill and slotter embodying the invention.

Referring first to Figs. 1 to 4 inclusive, 10 represents a work table adapted to support a stack of sheets against a back gauge 11 which is adjustable in the usual manner. A side gauge of conventional form, not illustrated herein, is also ordinarily employed. Suitable means may be provided, adapted to be operated either by a foot pedal or by power, for raising the table 10 to advance the work against the slotting cutter.

The machine head is illustrated at 12. In it is mounted by means of anti-friction and thrust bearings 13 and 14 a spindle 15 which is provided near its upper end with a pulley 16 over which runs a belt 17 that extends forward from a suitable source of power, such as an electric motor, which may be carried upon the head 12. The lower end of the spindle is adapted to receive a hollow drill, not shown, by means of which holes may be drilled in a stack of sheets when the machine is being used for that purpose.

In the machine head forward of the spindle 15 there is a vertically slidable post 18 upon the lower extremity of which is a pressure foot 19 adapted to engage the stack of sheets to assist the operator in holding them in position during a drilling or slotting operation. A coil spring 20 within the head acts to depress the post 18 and the foot 19.

When slotting is to be done, the machine motor is turned off and the spindle 15 is locked against rotation. A convenient locking means consists of an arm 21 having at its rear end a slot 22 for the reception of a stud 23 mounted in the head 12 and extending through the upper wall of a belt housing or cover 24. A nut 25 on the upper end of the stud holds in place the cover 24 as well as the arm 21. The forward end of the arm 21 constitutes a split clamp having a circular opening to receive the upper end of spindle 15, this opening being intersected by the slit 26 of the clamp. One leg of the clamp is threaded to receive a threaded pin 27 which projects through a smooth bore in the other leg and has a shoulder 28 taking against the outer surface of the latter leg. A knurled wheel 29 on the outer end of the pin 27 provides an easy means of tightening and loosening the clamp.

When the machine is to be used for slotting the paper drill is removed and a cutter holder 30 provided with a cylindrical upper end 31 is mounted in the spindle. The main portion of the holder is rectangular in cross-section, as shown in Fig. 4, and slidably fits within a vertical guide groove 32 formed in the back gauge.

In accordance with the present invention, the cutter consists of two separate elements or blades 33 and 34. Preferably, and as herein illustrated, these blades have curved forward walls which meet in a vertical line of intersection along the median plane of the cutter, the meeting surfaces being preferably ground so as to provide a close fit. The cutting edge is on the lower end of the cutter. As illustrated in Figs. 1 to 4 inclusive, the bevel is on the inner side of each blade, but it may be on the outer side as shown in Figs. 5 to 10 inclusive of the drawings, and is necessarily on the outer side when the slot to be cut is no wider than twice the thickness of the individual blades. It is also to be understood that while I prefer to have the blades come together at the front of the cutter, making a cross-section of U-shape, this is not essential. In mounting the cutter in the holder 30, I provide a spacer 35 between the blades at the rear and mount the blades with the spacer between them in a groove formed in the holder 30. These parts are then held against relative movement by pins 36 and 37 projected through aligned holes drilled in the holder, the blades, and the spacer. In this manner the rear portions of the blades are held in a rigid mounting.

In that form of the invention illustrated in Figs. 5, 6, and 7, the machine comprises a transverse bar or frame 38 provided with dovetail guide elements 39 and 40 upon which a plurality of heads 41 are mounted for adjustment transversely of the machine in order to vary the space between the holes or slots that are to be cut in the work. This type of machine is illustrated more in detail in the Lewis et al. Patent No. 2,044,709, issued June 16, 1936. Each one of the plurality of heads carries a spindle 42, adapted to receive either a hollow drill, not shown, or a slotting cutter holder 30' similar to the holder 30 above described. There is also provided in each head a post 43 and a presser foot 44 urged downwardly by a coil spring 45, these parts corresponding in function with the parts 18, 19, and 20 of the first described form of the invention. The machine is provided with a work table 46 upon which is mounted a back gauge 47. The gauge 47 supports a plurality of slotter guides 48, one for each head, which straddle the rail formed at the upper edge of the gauge and are provided with setscrews 49 by means of which the guides are secured in adjusted position.

Each of the holders 30' has a rabbet 50 formed in one forward corner, into which extends a batten 51 that is secured to the guide 48 by means of screws 52 or the like. The blades 33' and 34' are similar to the blades 33 and 34. They are separated by a spacer 35', and all of these parts are held against relative movement by pins 36' and 37' similar to the pins 36 and 37.

The functioning of the machine last described is the same as that of Figs. 1 to 4 inclusive, except that it cuts a plurality of slots at one time. The guide 48 provides relatively large surfaces of engagement with the holder 30', and thus prevents rotation of the holder. Also, the drive for the spindles preferably includes a worm and a worm wheel (not shown) which are non-reversing, and this in itself is a more or less effective lock against rotation of the spindle 42.

In Figs. 8, 9, and 10 I have made an exaggerated disclosure of what happens when the internal pressure on the cutter during a slotting operation becomes sufficiently great. In these figures a stack of sheets is indicated at 53. The cutter, which in the forms of the machine herein illustrated is stationary, is shown at 33', 34' with the line of juncture between the two blades at 54 in Fig. 8. As the table with the stack 53 rises and the cutter is forced into the stack, cuttings accumulate in the space between the blades, and at the front end of the latter, that is in the position most remote from the anchored parts of the blades, the pressure of these cuttings may tend to spread the blades apart as indicated in Fig. 9. The juncture line then becomes a narrow slit 55 somewhat wider at the top than at the bottom. In Fig. 10, where the stack has been pressed up until the cutter is forced all the way through the sheets, the pressure of the cuttings has increased, causing a still further separation of the front ends of the blades to form a wider slit 56, particularly at the upper end of the cutter. This spreading of the blades of course relieves the internal pressure, and, as a consequence, when the cutter enters the next stack of sheets the cuttings remaining between the blades will be forced out at the top, and no jamming will occur.

Where the width of the slot to be cut will permit, I prefer to put the bevel on the inner sides of the blades. The grinding of the bevel on the inside of a one-piece U-shaped cutter would present difficulties, but in the case of my invention the bevels may be ground quite readily in the individual blades before they are assembled in the holder.

The procedure commonly followed for preparing sheets for loose leaf binders is to drill round holes 57, 58 or 59, Figs. 11, 12, and 13, in the sheets and then to connect these holes with the adjacent edge of the sheets by means of slots 60, 61, and 62 respectively. Where a U-shaped cutter is employed, however, the drilling may be dispensed with if desired, and the slots 63, Fig. 14, formed exclusively by a U-shaped slotting cutter.

Variations from the described structure may be employed. Accordingly, I desire it to be understood that the scope of the invention is to be regarded as defined exclusively by the appended claims rather than by the foregoing description or the accompanying illustration.

Having thus described my invention, I claim:

1. In a paper slotter, a pair of cutter blades having cutting edges at one end, means for spacing apart the rear edges of said blades, and a holder in which the rear portions only of the blades are securely mounted, whereby the forward portions of the blades are free to flex slightly under the influence of internal pressure from the cuttings.

2. In a paper slotter, a cutter U-shaped in cross-section, said cutter being divided lengthwise in the bend between the sides of the U thereby forming two blades, said blades having cutting edges at one end, and a holder for gripping the blades at the rear only, whereby the blades may part slightly at the bend to more readily discharge cuttings.

3. In a paper slotter, a cutter having straight sides and a curved connecting portion, said cutter having a cutting edge at one end and being divided lengthwise in the said connecting portion, and means for holding only the straight side portions near their edges remote from the curved connecting portion.

4. In a paper slotter, a cutter U-shaped in cross-section having an internally beveled cutting edge at one end, said cutter being divided lengthwise in the bend between the sides of the U, and a holder for gripping the sides rearwardly of the bend, whereby the sides may part slightly to more readily discharge cuttings.

5. In a paper slotter, a cutter U-shaped in cross-section having a cutting edge at one end thereof, said cutter having a longitudinal slit in the bend between the sides of the U lengthwise, and means for holding the straight side portions of the cutter at the rear only, whereby the forward portions on either side of the slit are free to flex.

JOHN R. LEHMAN.